United States Patent
Li

(10) Patent No.: US 12,238,385 B2
(45) Date of Patent: Feb. 25, 2025

(54) SYSTEMS AND METHODS FOR FAST, INTUITIVE, AND PERSONALIZED LANGUAGE LEARNING FROM VIDEO SUBTITLES

(71) Applicant: Adeia Guides Inc., San Jose, CA (US)

(72) Inventor: Zhiyun Li, Kenmore, WA (US)

(73) Assignee: ADEIA GUIDES INC., San Jose, CA (US)

( * ) Notice: Subject to any disclaimer, the term of this patent is extended or adjusted under 35 U.S.C. 154(b) by 140 days.

(21) Appl. No.: 18/084,786

(22) Filed: Dec. 20, 2022

(65) Prior Publication Data

US 2024/0205508 A1 Jun. 20, 2024

(51) Int. Cl.
*H04N 21/488* (2011.01)
*H04N 21/466* (2011.01)
*H04N 21/472* (2011.01)

(52) U.S. Cl.
CPC ....... *H04N 21/4884* (2013.01); *H04N 21/466* (2013.01); *H04N 21/47217* (2013.01)

(58) Field of Classification Search
CPC ............. H04N 21/4884; H04N 21/466; H04N 21/47217; H04N 21/4888
USPC .......................................... 348/564; 704/8, 2
See application file for complete search history.

(56) References Cited

U.S. PATENT DOCUMENTS

| | | | |
|---|---|---|---|
| 11,163,959 | B2 | 11/2021 | Zhang et al. |
| 11,188,711 | B2 | 11/2021 | Krasadakis |
| 2007/0189724 | A1* | 8/2007 | Wan ................. G06F 40/58 386/329 |
| 2011/0164175 | A1* | 7/2011 | Chung ............ H04N 21/42209 348/468 |
| 2016/0301953 | A1 | 10/2016 | Garcia Navarro et al. |
| 2017/0083214 | A1 | 3/2017 | Furesjö et al. |
| 2017/0344530 | A1* | 11/2017 | Krasadakis ........... G09B 19/00 |
| 2021/0019369 | A1 | 1/2021 | Sharma et al. |
| 2022/0139370 | A1 | 5/2022 | Kim |
| 2022/0382448 | A1* | 12/2022 | Lu ....................... G06F 3/0482 |

FOREIGN PATENT DOCUMENTS

| | | |
|---|---|---|
| CN | 100469106 C | 3/2009 |
| KR | 20220048958 A | 4/2022 |

OTHER PUBLICATIONS

Anonymous, "How to bookmark subtitles?," (2021) (Retrieved Mar. 13, 2024; URL:https://web.archive.org/web/20210614055003/https://help.glotdojo.com/how-to-save -subtitles/).
Okamoto et al., "Toward Video Bookmarking Search: Search-Target Inference from TV Watching," International Conference on Semantic Computing (ICSC 2007), Irvine, CA, pp. 605-614 (2007).

* cited by examiner

*Primary Examiner* — John W Miller
*Assistant Examiner* — Omer Khalid
(74) *Attorney, Agent, or Firm* — HALEY GUILIANO LLP

(57) ABSTRACT

A vocabulary level of a user in a language to be learned is identified. During playback of a media asset on a first device, subtitles in the language are extracted for at least a portion of the media asset. The extracted subtitles may contain a single word, or a plurality of words in the language in question. Based on the vocabulary level, a subset of words from the extracted subtitles are predicted to be new to the user. The predicted new words are then generated for display on a second device associated with the user, along with an explanation of each word of the subset of words.

16 Claims, 11 Drawing Sheets

SYSTEMS AND METHODS FOR FAST, INTUITIVE, AND PERSONALIZED LANGUAGE LEARNING FROM VIDEO SUBTITLES

BACKGROUND

This disclosure is directed to learning languages through consumption of media assets. In particular, techniques are disclosed for fast, intuitive, and personalized language learning based on subtitles or closed captions provided with, or transcribed from, a media asset being consumed.

SUMMARY

An estimated 1.5 billion people across the globe are currently learning English. One of the most enjoyable ways to learn English is by watching media assets (e.g., TV shows) with English subtitles. However, learning from subtitles is not an easy task. While a user may notice new words in the subtitles, they will not want to pause and search for them, nor even keep track of them. As a result, the user ends up guessing the meaning of a word or ignoring the word altogether and never going back to look up a definition of the word. This applies to other languages as well.

What is needed is a more efficient way to learn new words from subtitles that meets user experience requirements. These requirements include fast word identification with minimal user interaction, minimum distraction to other users who are more familiar with the language, support for multiple learners simultaneously, and adaptive and personalized learning experiences for each user.

Learning language from subtitles is a quick way to increase vocabulary in a new language. Other than guessing a word's meaning from context, a typical way to learn language from subtitles is to display subtitles in multiple languages simultaneously. For example, a native Hindi speaker who wants to learn English may enable subtitles in both Hindi and English. This takes a lot of screen space and ultimately encourages the viewer to read the subtitles in their native language without learning the new language. This also is not ideal for a group of viewers who each have different native languages.

Another more interactive way to learn new words from subtitles is to allow the viewer to click on any word and see a definition, along with example sentences. While it might be easy or acceptable to the user to pause and click subtitles on a personal device, such as smartphone or laptop, it is disruptive to the watching experience even for a single user, let alone a group of users. This approach is also not suitable for televisions and other non-interactive display devices. While some applications do exist to allow a personal device to act as a second screen for interaction with a media asset being displayed on a first screen, these applications are not specifically designed for learning vocabulary.

This disclosure provides a fast, intuitive, and personalized system to learn new words from subtitles. More specifically, a second screen is used to display explanations of certain words which are predicted to be unknown, or new, to the user. Furthermore, the display of words and explanations on the second screen is adaptive based on personal preference and learning history of the user. The second screen might be a companion app on a smartphone, smart watch, smart glass, or even a display screen on TV remote control. Whenever the user sees an unknown word, they need only glance at the second screen, where the prediction algorithm will most likely show the explanation of that word. This also supports multiple viewers/learners simultaneously because each user may have their own second screen which can be personalized for them.

The approaches described in this disclosure present improvements over prior systems by not compromising viewing experience for any users. Everything on the display is the same as it would be without subtitles being enabled, or whether or not closed captions are being displayed. Each user, even among a group of users watching together, can customize their learning experience according to their native language and learning history. In some embodiments, a slider or other adjustable user input can be used to manually adjust the personal vocabulary level of the user so that appropriate words are displayed to the user on their second screen device. A personalized algorithm is used to choose and explain new words to the user automatically. The user is also provided with the ability to bookmark and review their learning experience at a later time. And because of the use of individual second screen devices, there is support for multiple users simultaneously watching the same media asset.

Subtitles are usually streamed as individual sentences, synchronized with the video content. The Universal Subtitle Format (USF) describes the subtitle using time stamp and other visual attributes, such as font style and size. The subtitles can be extracted from the USF data and analyzed. Words most likely to be unfamiliar to the user are then predicted and shown with explanations on the second screen with a glanceable UI. The glanceable UI allows the user to see the word they want to know with only a quick look at their second screen. All other interactions are minimized. The second screen may be a smartphone, smartwatch, or AR glass, etc. In the case of an AR glass second screen, predicted new words and their meanings may be automatically displayed in a portion of the AR display. This may be an unobtrusive or peripheral portion of the display that the use may choose to focus on or bring to the foreground when they would like to review a word.

To start with a reasonable prediction, a quiz or a questionnaire may be used to estimate the user's vocabulary level. Each word in the target language will be assigned with a level value. There are already many vocabulary estimators to achieve this, even considering native languages. In some embodiments, a user's language profile maybe constructed or created while the user is consuming media content. For example, subtitles or closed captions associated with segments that are replayed by the user may be analyzed and used as a vocabulary metric. Other feedback may also be collected from the user in real time while they are consuming the media content.

A user interface may be presented on a second screen, such as a smartphone. The screen may be off while the user is watching a media asset, and automatically wake up and open the companion app if the user raises the device for a quick glance during the media asset. The content of the companion app may be shown to the user, even on a lock screen or other portion of the display without requiring the companion app to be opened. Certain gestures, such as tapping twice or shaking can also be used to wake the second screen device.

The second screen displays a list of predicted new words for the user. The list of words is synchronized with the current subtitles for the media asset, regardless of whether or not display of the subtitles is enabled. The list of words may continuously scroll, following the timeline of the media asset. In other words, as additional predicted new words are encountered in the subtitle data, the predicted new words are prepended or appended to the list of words, and the list scrolls in accordance with how the words are added to the list (i.e., scroll up for prepended words, scroll down for appended words) so that the new words are easily visible to the user. The user can also scroll through the list of words to see other recent words added to the list.

In some embodiments, the screen may only show the most recent words with their explanations to make for a faster read and a more "glanceable" user interface. Adding a new word to the list may push older words off the list so that only a certain maximum number of words are displayed at any one time. A slider or other adjustment interface element may be used to increase or decrease the number of words displayed. This may be useful when the user is looking for a previous word that is no longer included as one of the most recent words or has been otherwise pushed off the list of words currently being displayed.

If the user is particularly interested in a certain word, the user can bookmark that word by interacting with the word (e.g., clicking or tapping the word) or some other user interface element associated with the word (e.g., a toggleable star or checkbox element). If a word is bookmarked, the subtitle containing the work is also tracked so that the user can replay the entire sentence and the video segment in which it was said. If the media asset is a live asset, bookmarking a word may also cause the video segment to be recorded, either locally on one or more of the first screen device and the second screen device, or on a cloud-based storage system. This allows the user to replay the video segment associated with the bookmarked word even before the live asset is made available as an on-demand asset (e.g., while the live event is still in progress).

Optionally, the user can use the second screen device to pause playback of the media asset on the first device. If multiple users are watching the media asset together, this function may be disabled. For example, the second screen device may detect the presence of other second screen devices also using the companion app to learn a language by watching the media asset. If other users are determined to be present, the companion app may suppress or disable this pause function.

Initially, a vocabulary classifier starts with the user's manual selection of a vocabulary level for the language they want to learn. Alternatively, a vocabulary test or questionnaire may be used to estimate the user's vocabulary level. Subtitle data for the media asset is fed to the vocabulary classifier in real time (i.e., as the media asset is played back). The classifier estimates each word's likelihood of being unknown to the user. For example, a user's vocabulary level may correspond to a knowledge of 5,000 words, then the user is very likely to be unfamiliar with words at a vocabulary level corresponding to knowledge of 10,000 words, and almost certainly unfamiliar with words at a vocabulary level corresponding to knowledge of 20,000 words. Predicted new words are sorted by decreasing vocabulary level. Only words with high confidence (i.e., high likelihood of being unknown to the user) will be selected to further action. The confidence threshold is determined by the user's vocabulary level. The confidence threshold may be adjusted if the user manually adjusts their vocabulary level.

Using the user's chosen dictionary (i.e., the language to learn), the selected words and their explanations are sent to the user's second screen device. This may be a direct transmission to the second screen device or may be a transmission to a companion app account associated with the user. In response, the user's second screen device may wake up and present the selected word(s) to the user. The list of words may be ordered temporally (i.e., in order of occurrence in the media asset).

The user's actions on the second screen device can be used to gauge the accuracy of the vocabulary classifier. The actions and inputs of the user are collected and used as additional training data for the classifier. For example, if the user manually adjusts their vocabulary level to make more or fewer words visible, the vocabulary level of the classifier is updated accordingly. Companion app access or second screen device wake up patterns can be used to confirm the accuracy of the predictions of words that are unfamiliar to the user. If the user ignores the second screen device when a predicted word is added to the list, the vocabulary level is adjusted. Similarly, the duration of the user's glance at the explanation of a word can be used to determine the accuracy of the current vocabulary level. A longer glance may indicate that the user is less familiar with the language than predicted and the level adjusted accordingly. Additionally, manual bookmarking of specific words may be used to increase the user's familiarity with the specific words. New training data is then used to update the vocabulary classifier.

Systems and methods are described herein for fast, intuitive, and personalized language learning from video subtitles. A vocabulary level of a user in a language to be learned is identified. During playback of a media asset on a first device, subtitles in the language are extracted for at least a portion of the media asset. The extracted subtitles may contain a single word, or a plurality of words in the language in question. Based on the vocabulary level, a subset of words from the extracted subtitles are predicted to be new to the user. The predicted new words are then generated for display on a second device associated with the user, along with an explanation of each word of the subset of words.

In some embodiments, user interactions with the second device are monitored. For example, whether the user looked at, moved, or entered an input into the second device within a threshold amount of time after a word or its explanation is generated for display may indicate whether the user is familiar with the word. Such information can be used to adjust the user's vocabulary level. For example, if the user interacted with the second device immediately upon display of the word, it may indicate that the user is less familiar with the language than predicted. If, on the other hand, the user does not interact with the second device at all within the threshold time, then the user may be more familiar with the language than predicted. The vocabulary level of the user may then be adjusted up or down accordingly.

To identify the user's vocabulary level, a user profile associated with the user may be accessed. The user profile may include language exposure information or other data indicative of the user's familiarity with the language in question. A language learning history may be retrieved from the user profile and, based on the language learning history, a familiarity of the user with the language may be determined.

In order to generate for display the subset of words on the second device, the subset of words and their respective explanations, may be transmitted to the second device. At the second device, the words/explanations may be added to a list of words and explanations that have previously been generated for display during playback of the media asset, or during playback of other media assets. The words may be appended or prepended to the list, such that the list is temporally ordered according to the time each word first appears in the subtitles, with the newest word at one end of the list and the oldest word at the other end. The list may then be automatically scrolled so that the end of the list containing the newest words is displayed. The display of predicted new words on the second device may occur synchronously with a display time of the respective subtitle in which each respective word is contained.

The number of words displayed at one time may depend on the size of display available on the second device. For example, if the second device is a smartphone, several words may fit on the display at one time. If the second device is a smart watch, however, only one word may be displayed at a time.

In some embodiments, the user may bookmark a word of the subset of words. In response to receiving an input to bookmark a word, a start time and end time for display of the corresponding subtitle are identified. The start time and end time, as well as an identifier of the media asset, are then stored in association with the word. In some cases, a corresponding segment of the media asset, or at least audio data thereof, may also be stored. In response to a later selection of the bookmark, the stored segment may be replayed. If the media asset is available on demand, the segment may not be stored. Instead, in response to selection of the bookmark, the identifier of the media asset is retrieved and used to access the media asset. The segment beginning at the start time and ending at the end time is then retrieved and replayed. If the media asset is still being played back, replay of the segment may be accomplished by instructing the first device to perform a rewind operation or other trick play function to return to the start time of the segment. In other embodiments, the first device may be instructed to pause playback of the media asset while the segment is retrieved and played back on the second device.

Sometimes, context of a word within a sentence is important for understanding the meaning of a word, or for identifying which of several different meanings for the same word was meant. Thus, an entire sentence containing the predicted new word may be transmitted to the second device rather than just the word. The sentence may then be amended to include the explanation of the word, either as an additional phrase within the sentence or as a substitute for the word. In other embodiments, an image corresponding to the explanation of a word may be displayed. If the user is consuming the media asset alone, the explanation of the word may be presented on the first device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
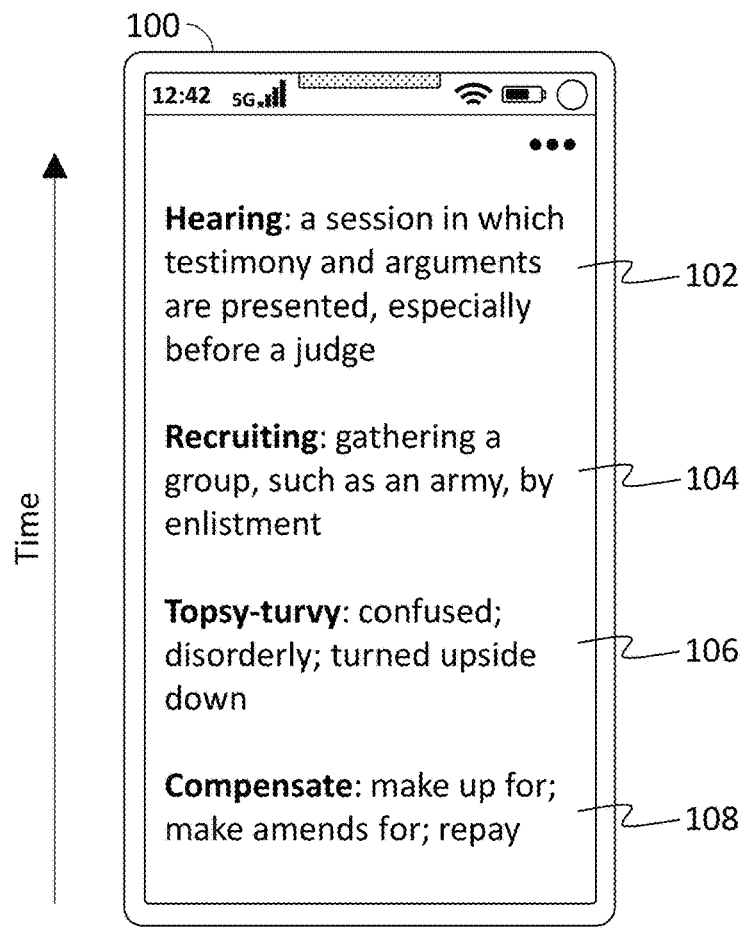
FIG. 1 shows an illustrative example of a second screen device displaying a list of predicted new words for a user, in accordance with some embodiments of the disclosure.

FIG. 1 shows an illustrative example of a second screen device displaying a list of predicted new words for a user, in accordance with some embodiments of the disclosure. Second screen device 100 may be a smartphone or tablet. An application running on second screen device 100 may be used to enable display of predicted new words to the user in accordance with some embodiments of the disclosure. Second screen device 100, or the application, may communicate with a media device or a media server through which the user is consuming a media asset. In some embodiments, second screen device 100 is registered with an account of the user associated with the media device or media server. Second screen device 100, or the application, may request predicted new words, or may receive predicted new words from the media device or media server, for example as push notifications, pulling, or WebSocket connection. This disclosure will use push notifications as a general term for illustration purposes.

While the user is consuming a media asset, new vocabulary words for the user are predicted, as will be described below. As each predicted new word is identified, the word and its meaning or explanation are generated for display on second screen device 100. For example, second screen device 100 may receive a push notification containing the word and its meaning or explanation. This may occur synchronously with output of the word in the media asset. The timing may be based on subtitle metadata which indicates a time at which the subtitle containing the word will be displayed. As shown in FIG. 1, word/meaning pairs 102, 104, 106, and 108 are displayed on second screen device 100, with the most recent word 102 at the top. If more words than fit on the display of second screen device 100 are generated for display, the user may be able to scroll through the list. As new words are added to the top of the list, the list is automatically scrolled up, resulting in older words no longer being displayed without the user manually scrolling through the list. In some embodiments, new words may be added to the bottom of the list, rather than the top, and the list is automatically scrolled down.

Figure 2:
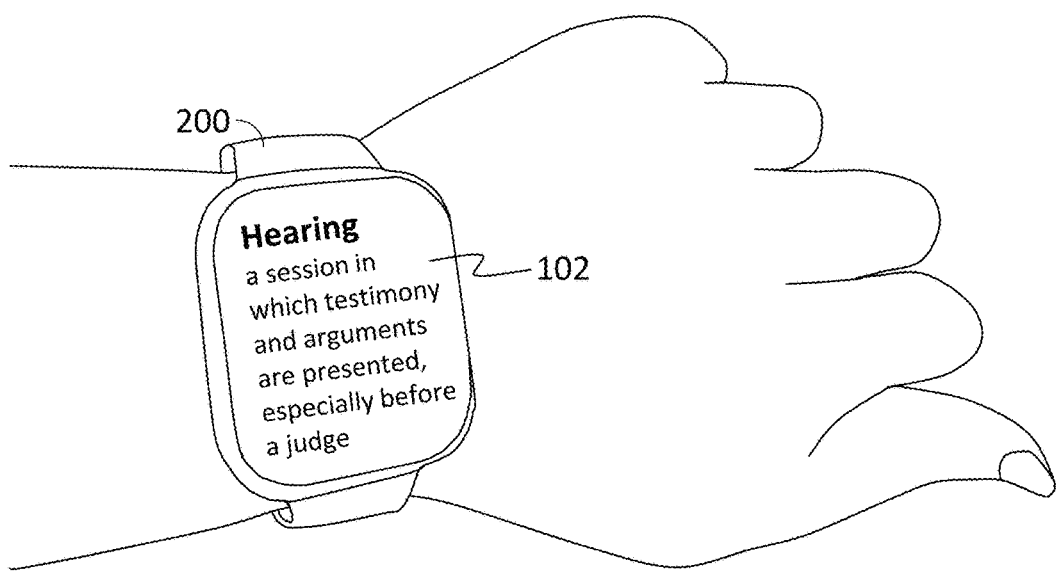
FIG. 2 shows an illustrative example of a second screen device displaying a predicted new word for a user, in accordance with some embodiments of the disclosure.

FIG. 2 shows an illustrative example of a second screen device displaying a predicted new word for a user, in accordance with some embodiments of the disclosure. Second screen device 200 is a smart watch. As the display if a smart watch is small, only a single word/meaning pair 102 is displayed at a time. As with second screen device 100, display of word/meaning pair 102 occurs synchronously with output of the word in the media asset.

Figure 3:
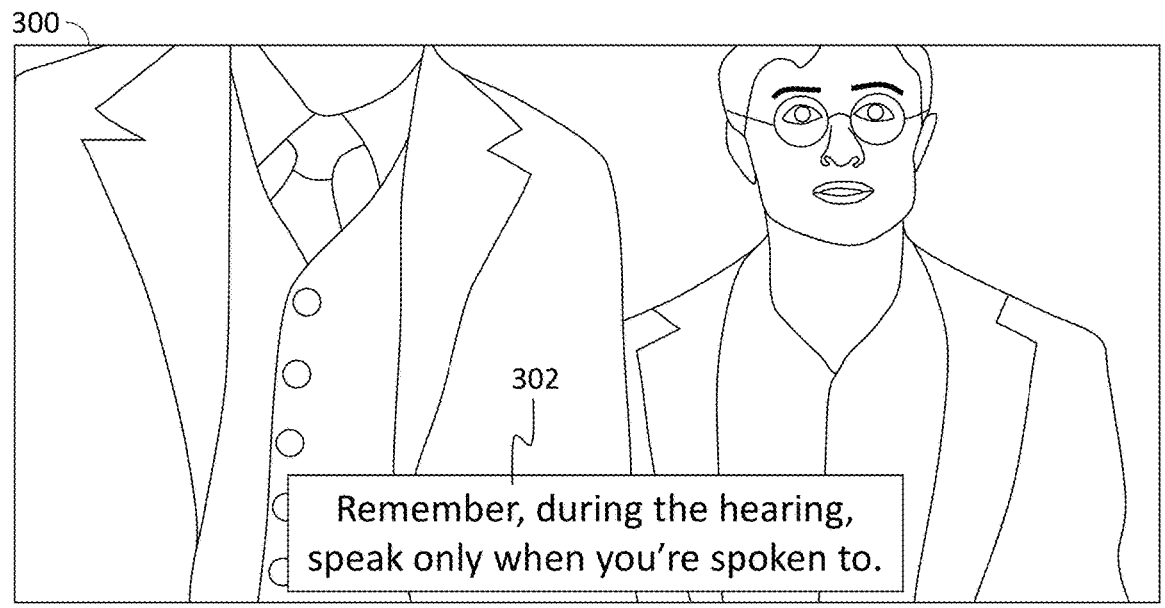
FIG. 3 shows an illustrative example of a subtitle and corresponding subtitle metadata, in accordance with some embodiments of the disclosure.

FIG. 3 shows an illustrative example of a subtitle and corresponding subtitle metadata, in accordance with some embodiments of the disclosure. Media asset 300 may have associated subtitles. The subtitles may be encoded into the media asset or in a separate data file. Subtitle 302 may be displayed at a specific time during playback of the media asset corresponding to the utterance of the words contained in the subtitle by a character or entity within the media asset. Subtitle data 304 may encode text 306 that is displayed as subtitle 302, as well as a start time 308 at which text 306 should be displayed and an end time 310 at which text 306 should be removed from display. If a word contained within text 306 (displayed as subtitle 302) is predicted to be new for the user, a corresponding word/meaning pair may be generated for display on a second screen device. If the user bookmarks the word, or otherwise selects to cause replay of a portion of the media asset corresponding to the word, start time 308 and end time 310 are used to identify the portion of the media asset to replay.

Figure 4:
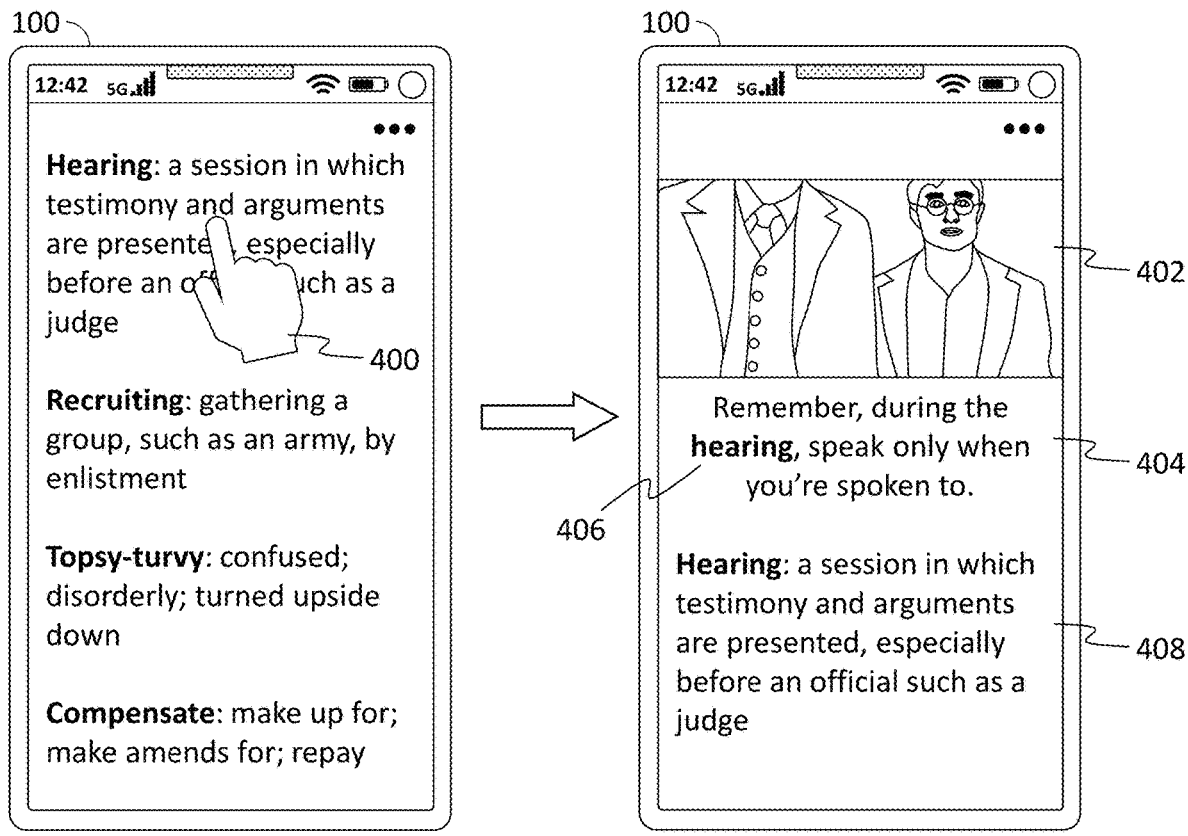
FIG. 4 shows a first illustrative example of a user selection of a word displayed on a second screen device, in accordance with some embodiments of the disclosure.

FIG. 4 shows a first illustrative example of a user selection of a word displayed on a second screen device, in accordance with some embodiments of the disclosure. Continuing the example of FIG. 1, above, a list of predicted new word is displayed on second screen device 100. Each word, and its associated meaning, may be selectable user interface elements. For example, the user may select a word by a tap 400 on a touchscreen of second screen device 100. In response to selection of the word, second screen device 100 displays segment 402 of the media asset during which the subtitle from which the selected word was extracted was displayed. Along with the segment, second screen device 100 may also display the subtitle 404, and may highlight, or otherwise accentuate, the selected word 406 within subtitle 404. If there is sufficient space on the display of second screen device 100, word meaning 408 may also be displayed.

Figure 5:
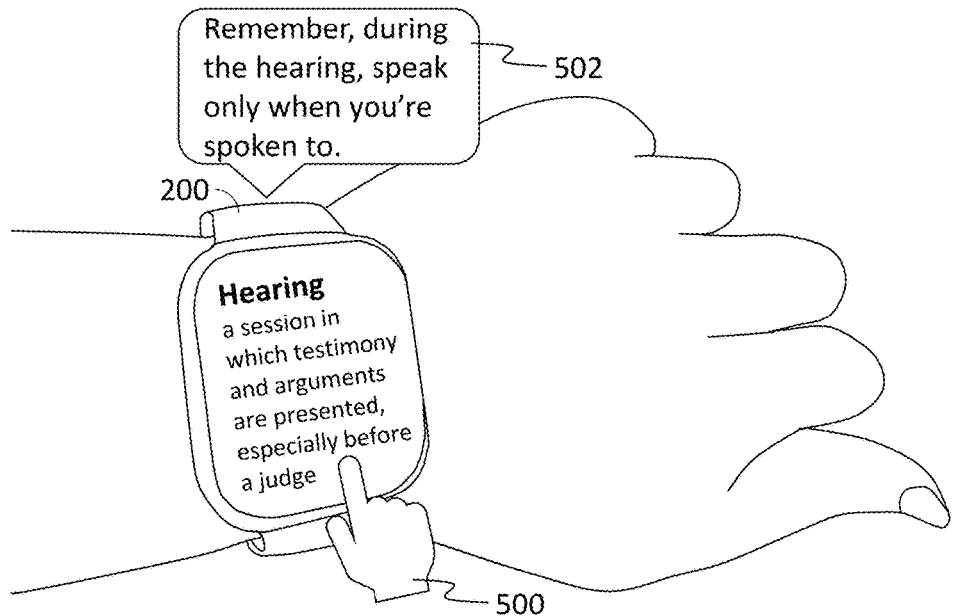
FIG. 5 shows a second illustrative example of a user selection of a word displayed on a second screen device, in accordance with some embodiments of the disclosure.

FIG. 5 shows a second illustrative example of a user selection of a word displayed on a second screen device, in accordance with some embodiments of the disclosure. Continuing the example of FIG. 2, above, a predicted new word is displayed on second screen device 200. The word, and its associated meaning, may be selectable user interface elements. For example, the user may select the word by a tap 500 on a touchscreen of second screen device 200. In response to selection of the displayed word, second screen device 500 may output audio 502 of the segment of the media asset from which the word was extracted.

Figure 6:
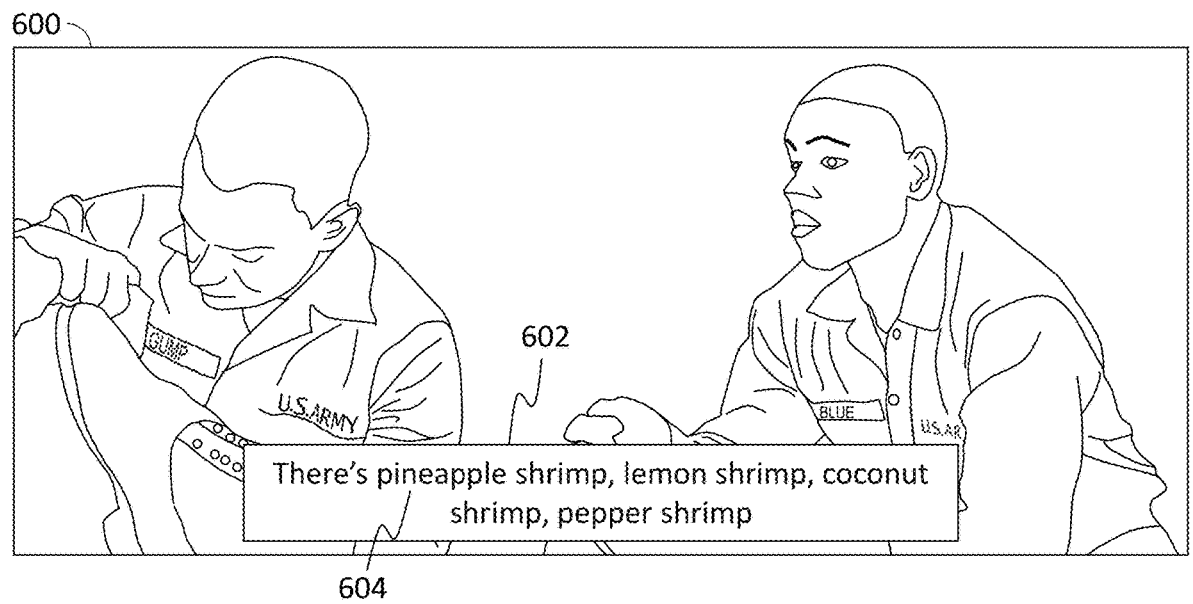
FIG. 6 shows an illustrative example of an image being displayed as an explanation of a predicted new word, in accordance with some embodiments of the disclosure.
Figure 6:
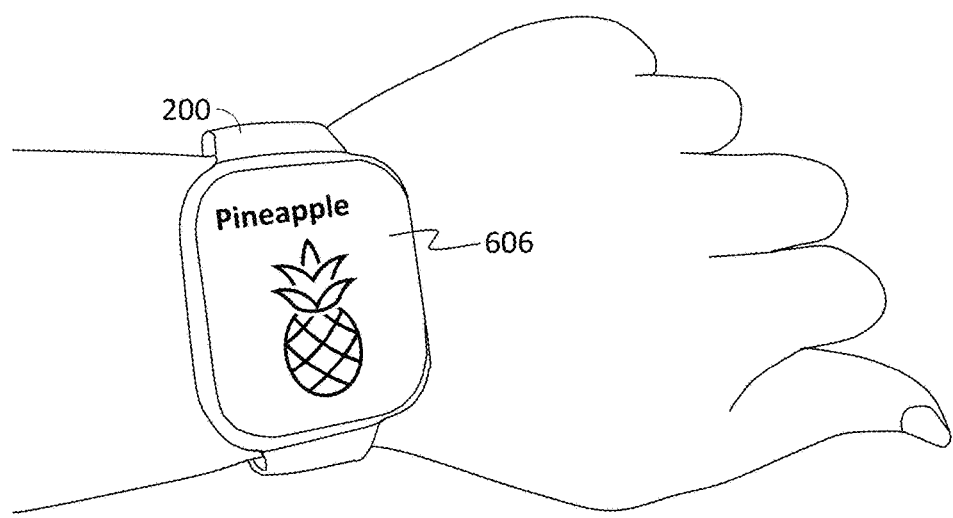

FIG. 6 shows an illustrative example of an image being displayed as an explanation of a predicted new word, in accordance with some embodiments of the disclosure. Media asset 600 may include subtitle 602. Subtitle 602 may include word 604 that is predicted to be a new word for the user. In this example, the new word is "pineapple." Most languages apart from English use the word "ananas" for pineapple, and therefore the word may need explanation. A textual description or definition of "pineapple" may not be easy to understand at a glance. In this case, a picture of a pineapple may be more informative and easier to understand. Accordingly, second screen device 200 displays word/meaning pair 606 that includes the word "pineapple" and a picture of a pineapple.

Figure 7:
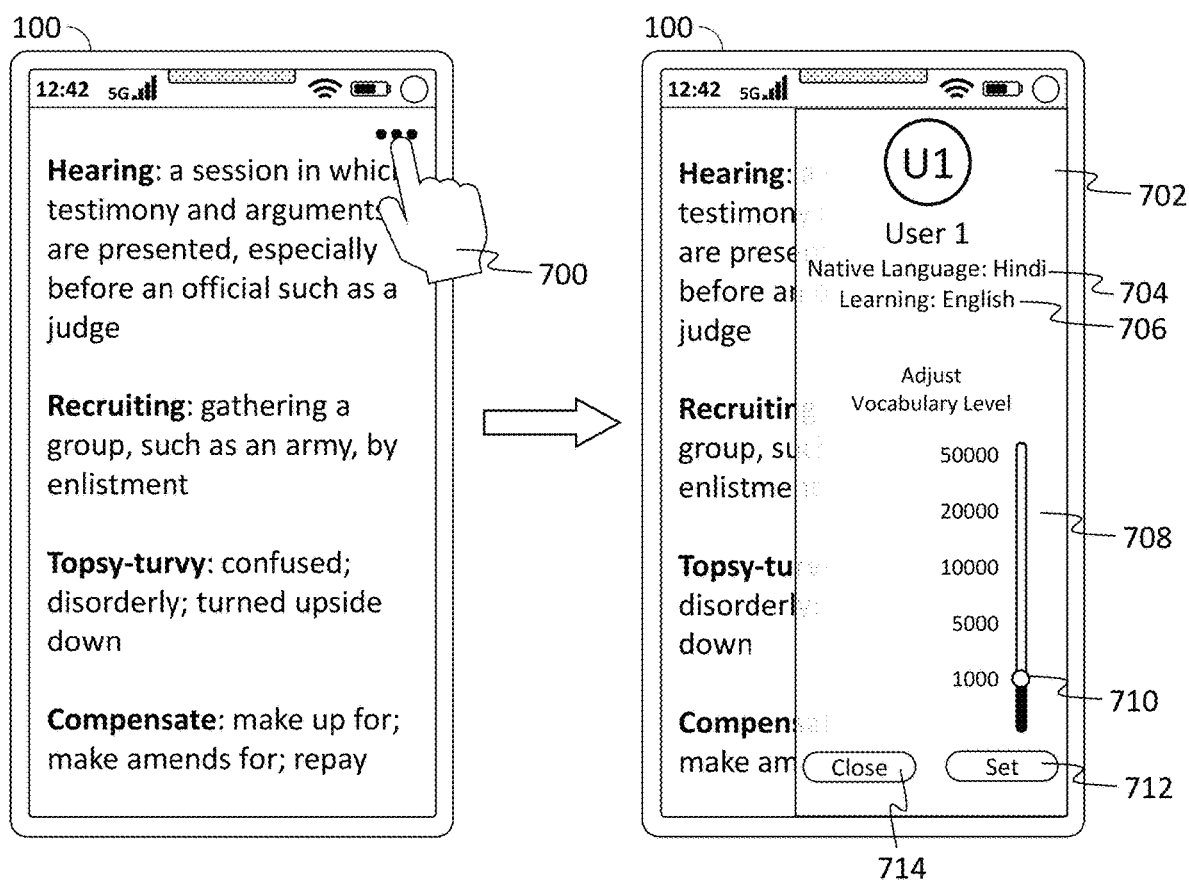
FIG. 7 shows an illustrative example of a user interface for adjusting a user vocabulary level, in accordance with some embodiments of the disclosure.

FIG. 7 shows an illustrative example of a user interface for adjusting a user vocabulary level, in accordance with some embodiments of the disclosure. While the user vocabulary level may be determined automatically from the user's language learning history and other known exposure to the language in question, the user may need to manually adjust the vocabulary level if they find that that too many or too few words are being predicted as new. For example, if too many words are being predicted as new and the user finds some of them to be words with which they are already familiar, the user may increase the vocabulary level. Similarly, if not enough words are being predicted as new and user is having trouble understanding the media asset, the user may reduce the vocabulary level.

An interface element displayed on a second screen device, such as second screen device 100, may be selected 700 by the user. In response, a settings panel 702 or other user interface may be displayed. Settings panel 702 may identify the user's native language 704, the language to be learned 706, and display a slider 708 or other adjustable interface element for the user's vocabulary level in the language to be learned. An indicator 710 of slider 708 corresponds to the current vocabulary level setting. The user may alter the vocabulary level and select a user interface element such as button 712 to apply the new vocabulary level. Button 714 may also be present to allow the user to close settings panel 702. In some embodiments, the language to be learned 706 may be the same as the user's native language 704. For example, the user may be child looking to expand their vocabulary.

Figure 8:
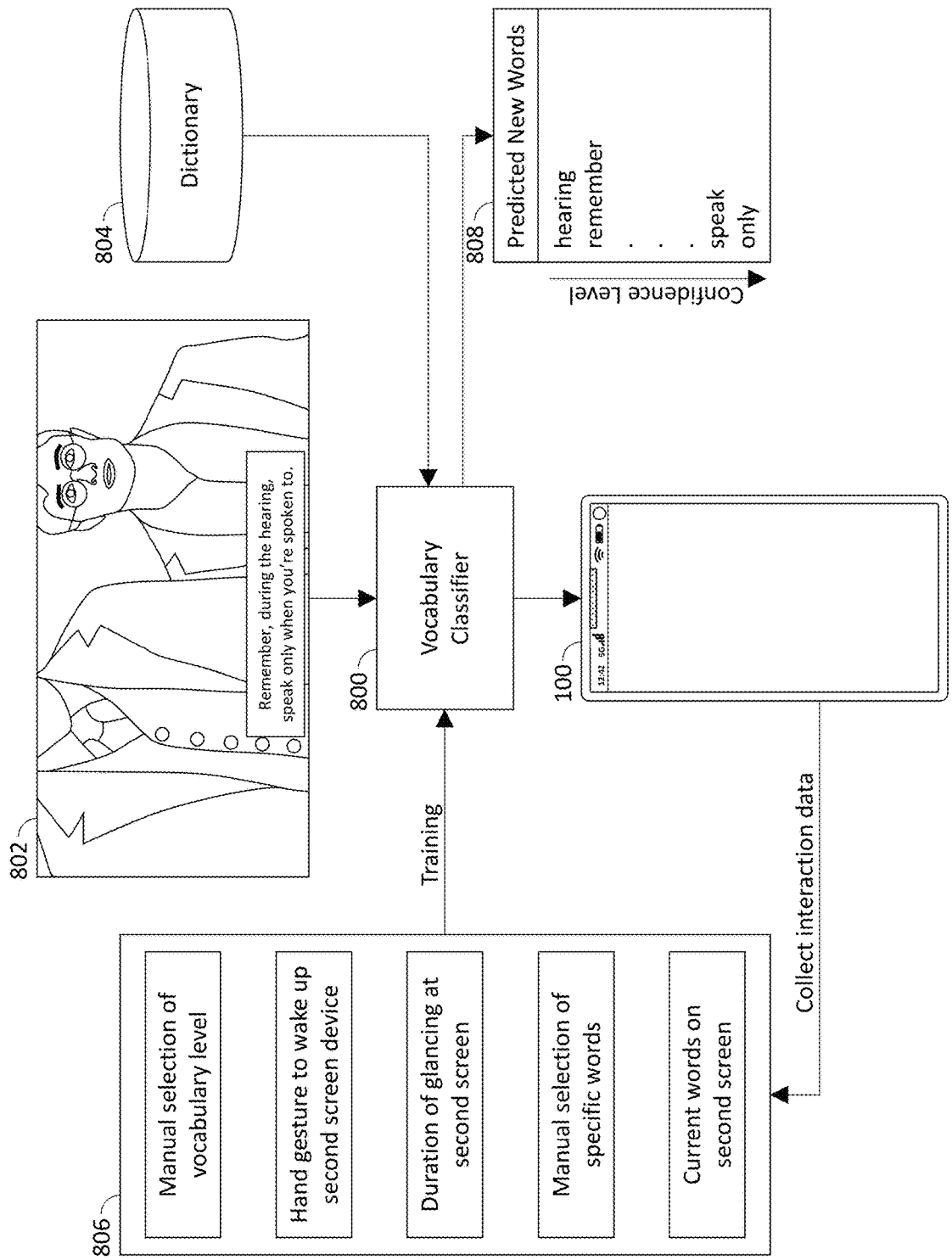
FIG. 8 is a diagram showing inputs to, and outputs from, a vocabulary classifier, in accordance with some embodiments of the disclosure.

FIG. 8 is a diagram showing inputs to, and outputs from, a vocabulary classifier, in accordance with some embodiments of the disclosure. In order to predict new wards for the user, vocabulary classifier 800 receives several inputs. One input is media asset 802, or at least subtitle data associated with media asset 802. This provides vocabulary classifier 800 with a set of words used in media asset 802 from which vocabular classifier 800 must predict new words. A second input come from dictionary 804, which provides vocabulary classifier 800 with definitions, meaning, and usages of each word in the language of the subtitles. Dictionary 804 may also provide images corresponding to some meanings where appropriate.

A third input to vocabulary classifier 800 is training data based on user interactions with second screen device 100. For example, whether the user looked at, moved, or entered an input into the second device within a threshold amount of time after a word or its explanation is generated for display may indicate whether the user is familiar with the word. If the user interacted with the second device immediately upon display of the word, it may indicate that the user is less familiar with the language than predicted. If, on the other hand, the user does not interact with the second device at all within the threshold time, then the user may be more familiar with the language than predicted.

In some embodiments, second screen device 100 may be in a sleep state or displaying a lock screen or other minimally interactive interface. When a predicted new word is to be generated for display, the user may first need to unlock or wake second screen device 100. The time between transmission of the word to second screen device 100 and the input to wake or unlock second screen device 100 may be used to determine the user's familiarity with the predicted new word. Other types of inputs, including selection or bookmarking of displayed words, the current words being displayed in the list of words, and manual adjustment of the vocabulary level may be all used as training data for vocabulary classifier 800.

Based on the training data, vocabulary classifier 800 identifies words in subtitles of media asset 802 that are unlikely to be known to the user based on their current vocabulary level. Vocabulary classifier generates a list of predicted new words. Each word is given an associated confidence level. The confidence level is based on the user's current vocabulary level and linguistic data for the language to be learned, which may be received or retrieved from dictionary 804. For example, the relative frequency of use of a word in the language may be used to determine a confidence level for whether the user has yet been exposed to the word. The list of predicted new words is then sorted by confidence level. The highest confidence word or words are then selected. A confidence threshold may be used to determine which words are to be selected. Vocabulary classifier 800 then transmits the selected words to second screen device 100 to be generated for display.

Figure 9:
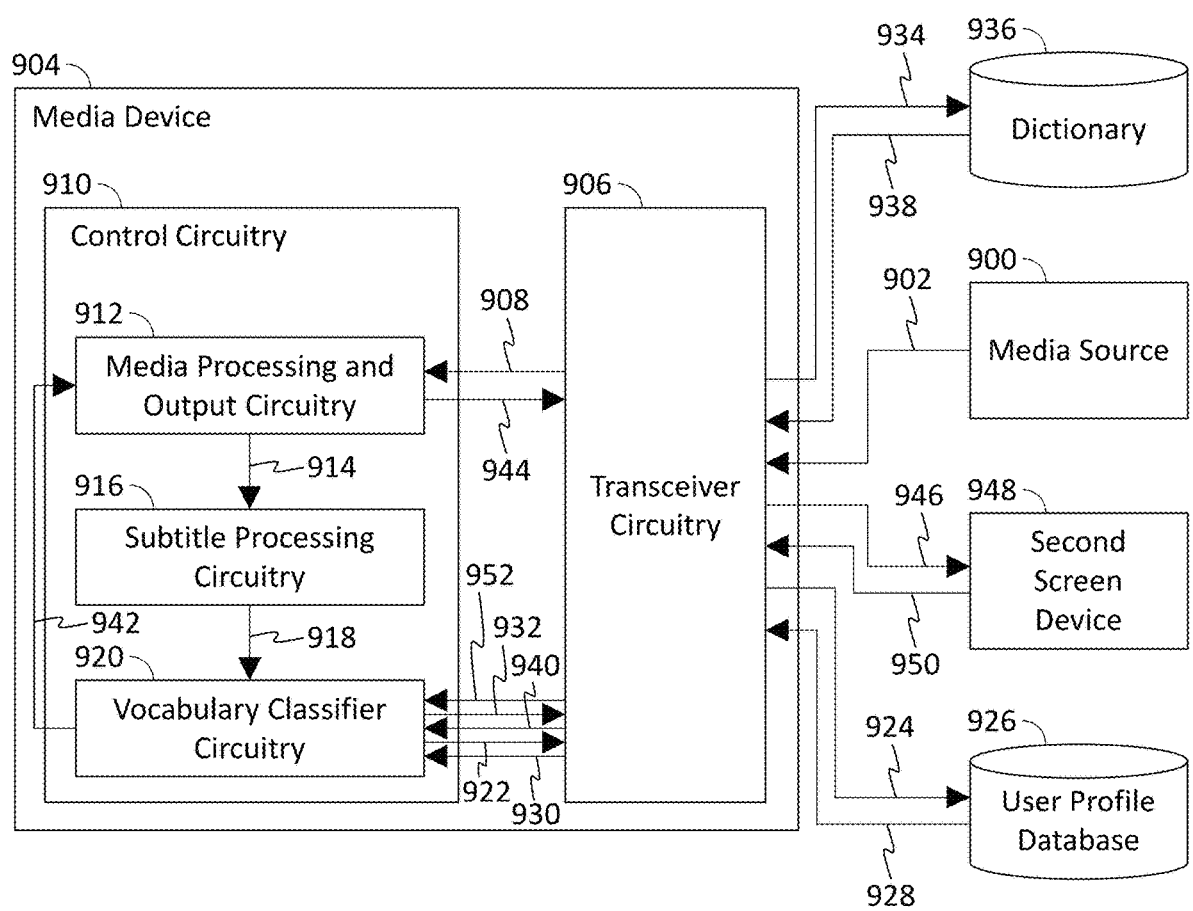
FIG. 9 is a block diagram showing component and data flow therebetween of a media device configured to predict nee vocabulary words for a user, in accordance with some embodiments of the disclosure.

FIG. 9 is a block diagram showing component and data flow therebetween of a media device configured to predict nee vocabulary words for a user, in accordance with some embodiments of the disclosure. Media source 900 transmits 902 media data of a media asset to media device 904. Media device 904 may be a smart television, a set-top box, a personal computer or laptop, a tablet, a smartphone, or any other media device capable of receiving and outputting the media. In some embodiments, media device 904 may be a DVD or Blu-ray disc player. Media device 904 may include an output device such as a screen and/or speakers, or may be interposed between media source 900 and an output device, wherein media device 904 processing incoming media data and transmits the processed data over a communication path, such as an HDMI cable, to the output device.

Media device 904 receives the media data using transceiver circuitry 906. Transceiver circuitry 906 may comprise a network connection over which data can be transmitted to and received from remote devices, such as an ethernet connection, Wi Fi connection, mobile broadband interface, or connection employing any other suitable networking protocol. Transceiver circuitry 906 may also include a cable television tuner or other connection suitable for receiving broadcast media and VOD content from a cable headend. Transceiver circuitry 906 transmits 908 the received media data to control circuitry 910, where it is received at media processing and output circuitry 912. Control circuitry 910 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Media processing and output circuitry 912 processes the media data for output to a first screen device. For example, the media data may be received in a first format, such as an H.264 media stream. Media processing and output circuitry 912 may include one or more codecs for decoding the H.264 stream and converting it into a format suitable for the output device. Media processing and output circuitry 912 also extracts subtitles from the media data. For example, the media data may include an embedded file (e.g., a VTT file) or data stream comprising metadata describing subtitles and their respective display times within the media asset, such as the subtitle data described above in connection with FIG. 3. In some embodiments, the subtitles may be closed captions extracted directly from video frames of the media data, such as the vertical blanking interval. Media processing and output circuitry 912 then transmits 914 the extracted subtitles to subtitle processing circuitry 916.

Subtitle processing circuitry 916 identifies the language of the subtitles. A given media asset may include subtitles in multiple languages. Subtitle processing circuitry 916 determines which subtitles are in the language to be learned by the user. For example, subtitle processing circuitry may compare a language identifier of each subtitle file, or each individual subtitle, to an identifier of the language to be learned. In some embodiments, subtitle processing circuitry 916 may compare the text of the subtitles to known language dictionaries to identify the language of the subtitles. Once subtitles in the language to be learned have been identifier, subtitle processing circuitry 916 transmits 918 the appropriate subtitles to vocabulary classifier circuitry 920.

Vocabulary classifier circuitry 920 processes each word of each subtitle to predict which of the words is new for the user. A new word is a word that the user has not been exposed to before. In some cases, a word may also be considered new if it is an uncommon word that the user has not been exposed to for a threshold period of time. The length of the threshold period of time may be dependent on the vocabulary level and learning history of the user. If the user has a high vocabulary level and/or has a steady learning history, the user is more likely to remember more words. Therefore, the threshold period of time may be set at 30 days. If, however, the user's learning history has been sporadic and/or the user has a low vocabulary level, the period of time may be set at 7 days.

Vocabulary classifier circuitry 920 may retrieve the user's vocabulary level and learning history from a user profile associated with the user. Vocabulary classifier circuitry 920 transmits 922 a request for the user profile information to transceiver circuitry 906, which in turn transmits 924 the request to user profile database 926. The request may include an identifier of the user, which is used by user profile database 926 to retrieve the appropriate information. The information is then transmitted 928 to media device 904, where transceiver circuitry 906 receives the information and transmits 930 the information to vocabulary classifier circuitry 920.

Based on the user's vocabulary level and language learning history, vocabulary classifier circuitry 920 calculates, for each word of the subtitles, a confidence level for whether the word is new for the user. For example, vocabulary classifier circuitry 920 may determine the average usage frequency of each word of the subtitle within the language as a whole. Vocabulary classifier circuitry 920 may obtain this information from a dictionary or other language database. Vocabulary classifier circuitry 920 transmits 932 a request for language information for a word to transceiver circuitry 906, which in turn transmits 934 the request to dictionary 936. Dictionary 936 transmits 938 the language information for the word, including usage information and definitions and meanings of the word to transceiver circuitry 906, which in turn transmits 940 the language information to vocabulary classifier circuitry 920. If the user has not been exposed to the word before or has been exposed to the word more than the threshold amount of time prior to the current appearance of the word, and the usage information indicates that the word is less common than words commensurate with the user's current vocabulary level, vocabulary classifier circuitry 920 may assign a high confidence value to the word. If, however, the usage information is commensurate with the user's current vocabulary level, than a lower confidence level is assigned to the word. Vocabulary classifier circuitry 920 selects the highest-confidence words as the predicted new words to generate for display to the user.

Vocabulary classifier circuitry 920 transmits 942 the selected words, along with their respective meaning, to media processing and output circuitry 912. Media processing and output circuitry 912 generates the words and their respective meanings for output on a second screen device. For example, media processing and output circuitry 912 transmits 944 the words and meanings to transceiver circuitry 906, which in turn transmits 946 the words and meanings to second screen device 948. In some embodiments, media device 904 may not be in direct communication with second screen device 948. Instead, both media device 904 and second screen device 948 may both be registered with a server or other intermediate device. The words and meanings are then transmitted to the server, which in turn transmits notifications to second screen device 948 when new words are predicted.

Media device 904 may monitor user interactions with second screen device 948. The user interactions may be used as additional training data for vocabulary classifier circuitry 920. For example, the amount of time between display of a predicted new word on second screen device 948 and when the user looks at, wakes, or unlocks second screen device 948 in order to see the word and/or its meaning may be monitored. Second screen device 948 may include a camera or other sensor to detect when the user is looking at second screen device 948. Second screen device 948 may also use motion sensors (e.g., inertial measurement units, accelerometers, gyroscopes, etc.) to detect when the user has made a gesture with second screen device 948 intended to wake second screen device 948 from a sleep or locked state. A traditional unlock sequence (e.g., entering a PIN or drawing a unique shape on a grid, facial recognition, biometric recognition, etc.) may also be used. The time at which the user interacts with second screen device 948 is compared to the time at which the word is transmitted to second screen device 948. The amount of time between the two events may be stored.

Other interactions can be used as well. For example, if the user bookmarks a word, it may indicate that the user was unfamiliar with the word and therefore intends to review it at a later time. Conversely, if the user selects to dismiss a word from the list, it may indicate that the user is already familiar with the word. The duration of the user's interaction with a word or with second screen device 948 or the application being used to display predicted new words may also be indicative of the user's familiarity with the words being displayed. These types of interactions may also be stored.

All stored interaction data is transmitted 950 to media device 904, where it is received using transceiver circuitry 906 and relayed 952 to vocabulary classifier circuitry 920. The interaction data may be collected over a period of time and transmitted together or may be transmitted individually in real time as the interactions occur.

Upon receipt of the interaction data, vocabulary classifier circuitry 920 may determine the accuracy of the predictions and, if necessary, adjust the user's vocabulary level. For example, if the amount of time between transmission of a word to second screen device 948 and the user's interaction with second screen device 948 is within a threshold amount of time, such as 5 seconds, it may indicate that the user has looked at the predicted new word, thereby confirming the accuracy of the prediction. Based on the interaction data, vocabulary classifier circuitry 920 adjusts the vocabulary level of the user to improve future predictions of new words.

Figure 10:
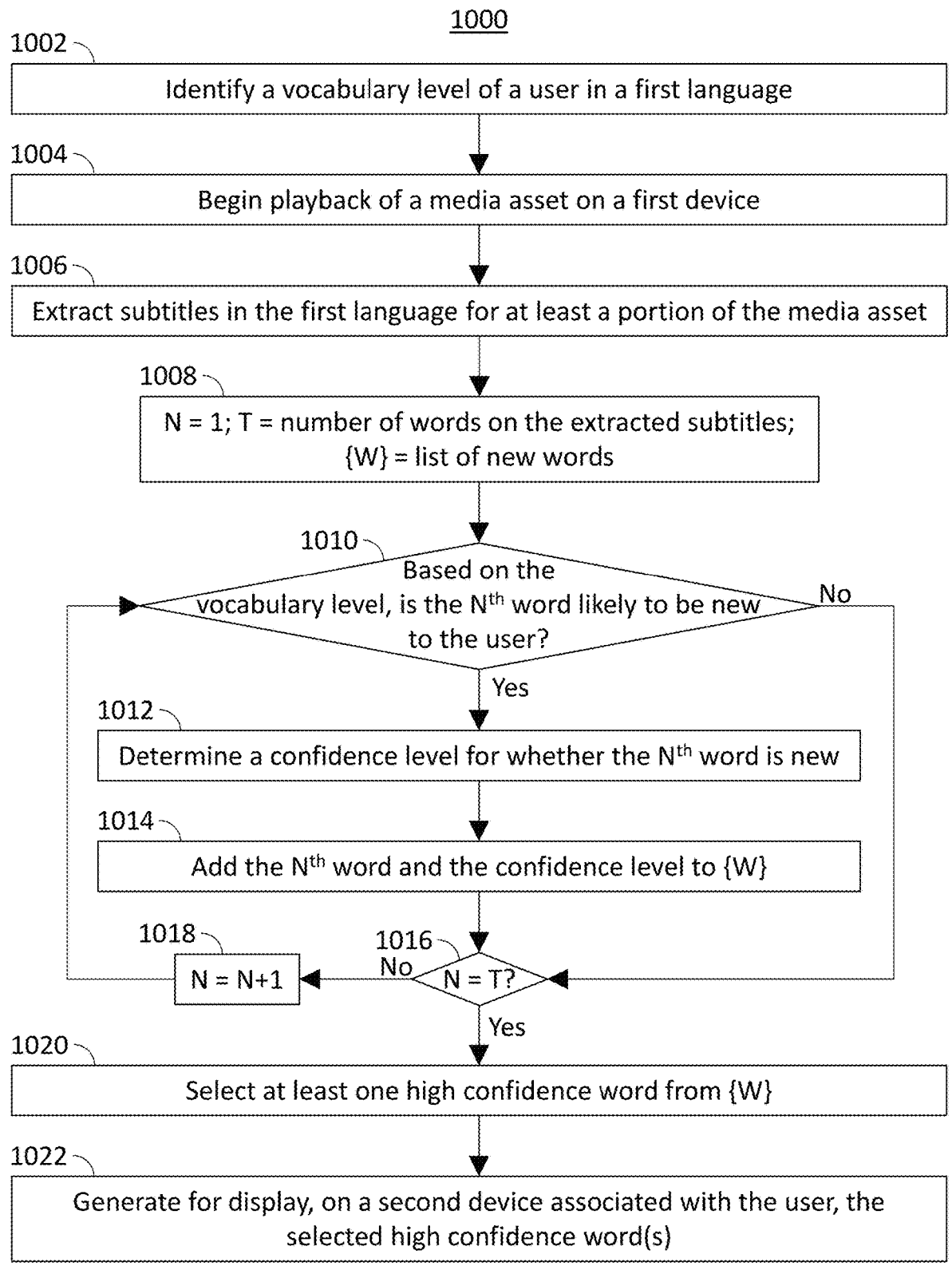
FIG. 10 is a flowchart representing an illustrative process for predicting new words and generating the predicted new words for display, in accordance with some embodiments of the disclosure.

FIG. 10 is a flowchart representing an illustrative process 1000 for predicting new words and generating the predicted new words for display, in accordance with some embodiments of the disclosure. Process 1000 may be implemented on control circuitry 910. In addition, one or more actions of process 1000 may be incorporated into or combined with one or more actions of any other process or embodiment described herein.

At 1002, control circuitry 910 identifies a vocabulary level of the user in a first language. For example, control circuitry 910 may access a user profile associated with the user. The user profile may contain a vocabulary level which can be retrieved by control circuitry 910. Alternatively, control circuitry 910 may retrieve langue learning history information, media consumption history for media assets in the language to be learned, and other linguistic data. Control circuitry 910 may then calculate a vocabulary level of the user based on the retrieved data.

At 1004, control circuitry 910 begins playback of a media asset on a first device. Control circuitry 910 receives media data from a media source. Control circuitry 910 may either be part of the first device and directly drive an output component of the first device, or transmit media data to the first device for output. At 1006, control circuitry 910 extracts subtitles in the first language for at least a portion of the media asset. Control circuitry 910 may extract subtitle metadata from a separate subtitle file, data structure, or data stream. In some embodiments, control circuitry 910 may extract closed captioning data from video frames of the media asset.

At 1008, control circuitry 910 initializes a counter variable N, setting its value to one, a variable T representing the number of words in the extracted subtitles, and an array or data structure {W} to contain predicted new words. At 1010, control circuitry 910 determines, based on the vocabulary level of the user, whether the $N^{th}$ word is likely to be new to the user. The vocabulary level of the user may correspond to a type and/or complexity of words familiar to the user. Control circuitry 910 may retrieve dictionary data, including language usage data, for the $N^{th}$ word. Based on the type and complexity of the $N^{th}$ word, control circuitry 910 may determine the likelihood that the user is familiar with the $N^{th}$ word. For example, if the $N^{th}$ word is similar in type and complexity to words with which the user is already familiar, the word may be less likely to be new to the user than a more complex word or a word of a different type.

If the word is likely to be new to the user ("Yes" at 1010), then, at 1012, control circuitry 910 determines a confidence level for whether the $N^{th}$ word is new. The confidence level may be based on the vocabulary level and the usage data for the word. In some embodiments, the confidence level may be a value determined prior to determining whether the $N^{th}$ word is likely to be new to the user and is then used as the basis for that determination. In other embodiments, however, control circuitry 910 determines the confidence level as a function of the likelihood that the $N^{th}$ word is new to the user. For example, a first value may be calculated to determine the likelihood that the $N^{th}$ word is new to the user. Control circuitry 910 may then determine a word is likely to be new to the user if the first value is above a threshold. Control circuitry 910 may then scale the first value by, for example, multiplying the difference of the likelihood value and 0.5 by 2. For example, if the likelihood that the $N^{th}$ word is new to the user is 0.6, control circuitry 910 may multiply the different of 0.6 and 0.5 by 2, resulting in a confidence level of 0.2. If the likelihood that the $N^{th}$ is new to the user is 0.95, control circuitry 910 may multiply the difference of 0.95 and 0.5 by 2, resulting in a confidence level of 0.9. At 1014, control circuitry 910 adds the $N^{th}$ word and its confidence level to $\{W\}$.

After adding the $N^{th}$ word and its confidence level to $\{W\}$, or if the $N^{th}$ word is not likely to be new to the user ("No" at 1010), at 1016, control circuitry 910 determines whether N is equal to T, meaning that all words in the extracted subtitles have been processed. If N is not equal to T ("No" at 1016), then, at 1018, control circuitry 910 increments the value of N by one and processing returns to 1010.

If N is equal to T ("Yes" at 1016), then, at 1020, control circuitry 910 selects at least one high confidence word from $\{W\}$. For example, control circuitry 910 may perform a sort function on $\{W\}$, arranging the words in decreasing order of confidence. Control circuitry 910 may then select the word or words with the highest confidence level. At 1022, control circuitry 910 generates for display, on a second device associated with the user, the selected high confidence word(s). For example, control circuitry 910 may communicate with a server with which the second device is registered and transmit the selected high confidence word(s) to the server for transmission to the second device.

In some embodiments, control circuitry 910 may reside on a server. For example, control circuitry 910 may be used in a playback server. The playback service may feed metadata to vocabulary classifier circuitry 920. The metadata may include an identifier of the media asset. Vocabulary classifier circuitry 920 may use the identifier to fetch the closed captioning data or subtitle file for the media asset. The playback service may report playback commands received from the user, such as "pause," "stop," "rewind," etc. The reporting of these commands allows the language processing functions described above to stay synchronized with the playback of the media asset. The server, or a cloud service of which the server is a part, communicates with a companion application on the second screen device.

In another embodiment, before playback of the media asset starts, control circuitry 910 may prompt the user to identify who is watching so that different language profiles can be analyzed (since different people may be learning different languages or have different vocabulary levels). Identification of users may also be done automatically though facial recognition, device recognition, or any other suitable technique. The user may also select a user profile for themselves and one or more other users when logging in. Each user profile may be associated with a device identifier of a device belonging to the respective user. The identified device will then receive the predicted new words for that user.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
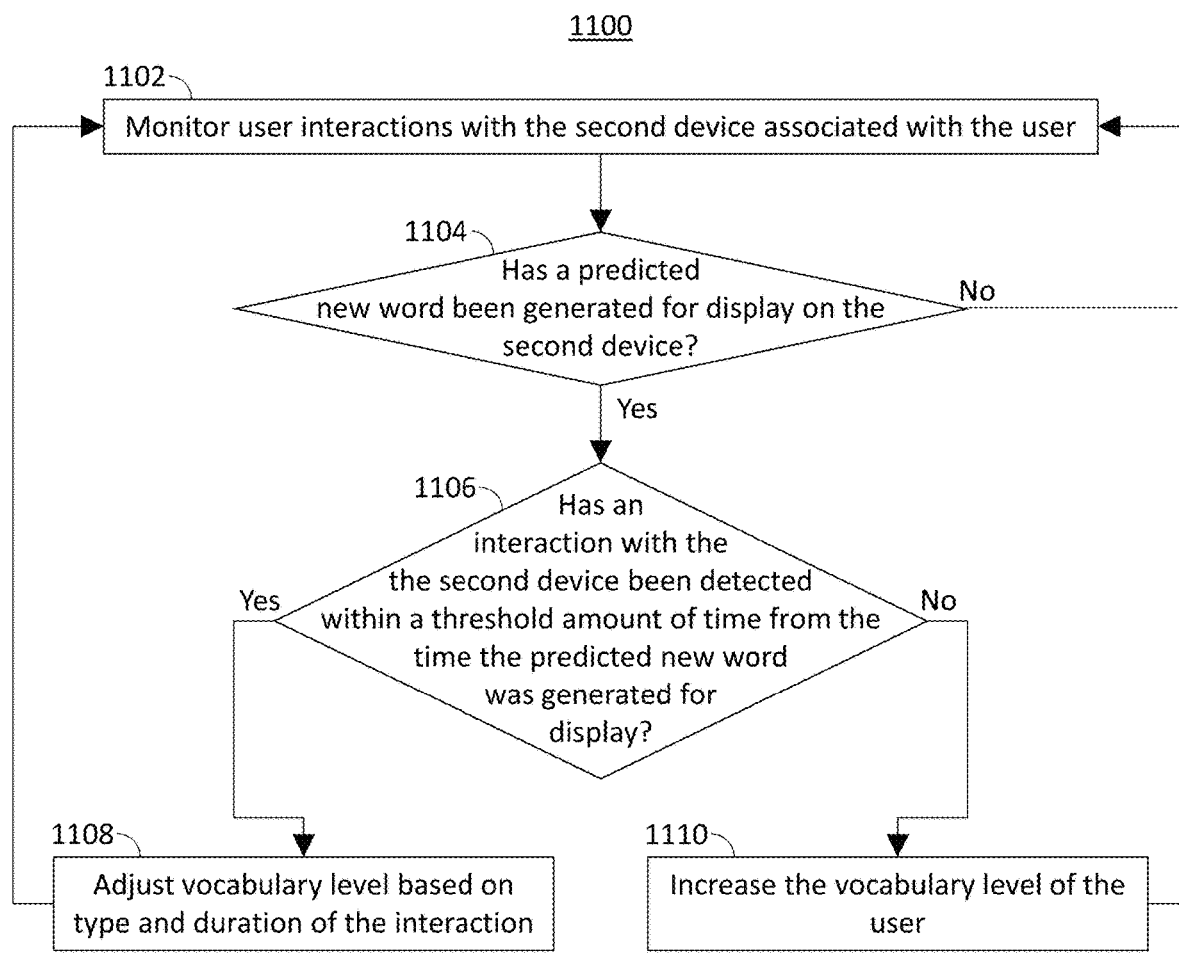
FIG. 11 is a flowchart representing an illustrative process for adjusting a user vocabulary level based on user interactions, in accordance with some embodiments of the disclosure.

FIG. 11 is a flowchart representing an illustrative process 1100 for adjusting a user vocabulary level based on user interactions, in accordance with some embodiments of the disclosure. Process 1100 may be implemented on control circuitry 910. In addition, one or more actions of process 1100 may be incorporated into or combined with one or more actions of any other process or embodiment described herein.

At 1102, control circuitry 910 monitors user interactions with the second device associated with the user. Control circuitry 910 may communicate with the second device directly or with a server with which the second device is registered. Interactions events and inputs on the second device may be tracked and reported to control circuitry 910 in real time or near-real time.

At 1104, control circuitry 910 determines whether a predicted new word has been generated for display on the second device. For example, a flag or Boolean may be set to TRUE when a predicted new word is transmitted to, or generated for display on, the second device. Control circuitry 910 may then check the value of this flag to determine if a predicted new word has been generated for display. After a threshold amount of time, the flag value may be reset to FALSE in order to prevent false positive determinations. If no predicted new words have been generated for display ("No" at 1104), then processing returns to 1102, where control circuitry 910 continues to monitor user interactions with the second device.

If a predicted new word has been generated for display ("Yes" at 1104), then, at 1106, control circuitry 910 determines whether an interaction with the second device has been detected within a threshold amount of time from the time the precited new word was generated for display. As described above, many types of interactions with the second device may be monitored, including wake or unlock inputs or gestures, selections of displayed words, bookmarking of displayed words, whether the user is looking at the second device and the duration for which the user's gaze toward the second device is held. The time at which the interaction is detected is compared with the time at which the most recent word was generated for display on the second device to determine how much time elapsed between display of the word and the user interaction.

If the elapsed time is within a threshold, such as 5 seconds ("Yes" at 1106), then, at 1108, control circuitry 910 adjusts the vocabulary level based on the type and duration of the interaction. For example, a long interaction may indicate that the user had difficulty understanding the explanation of a word or needed to review explanations for more than one word. Accordingly, control circuitry 910 may decrease the vocabulary level of the user. In response to a lower vocabulary level, additional words may be predicted as new. Also, explanations of words may be simplified so that they are understandable by the user. If the user's interaction is quick or dismissive of one or more words, control circuitry 910 may increase the vocabulary level. In some embodiments, if the vocabulary level is too low, the explanations may be provided in the user's native language until the user's vocabulary level reaches a point where explanations can effective be communicated to the user in the language to be learned.

If no interaction was detected within the threshold time ("No" at 1106), then, at 1110, control circuitry 910 increased the vocabulary level of the user. A lack of interaction may indicate that the user was already familiar with, or did not need an explanation of, the predicted new word. From this, control circuitry 910 infers that the user is already familiar with the predicted new word and increased the vocabulary level accordingly. After adjusting the vocabulary level at either 1108 or 1100, processing returns to 1102, where control circuitry 910 continues to monitor user interactions with the second device.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
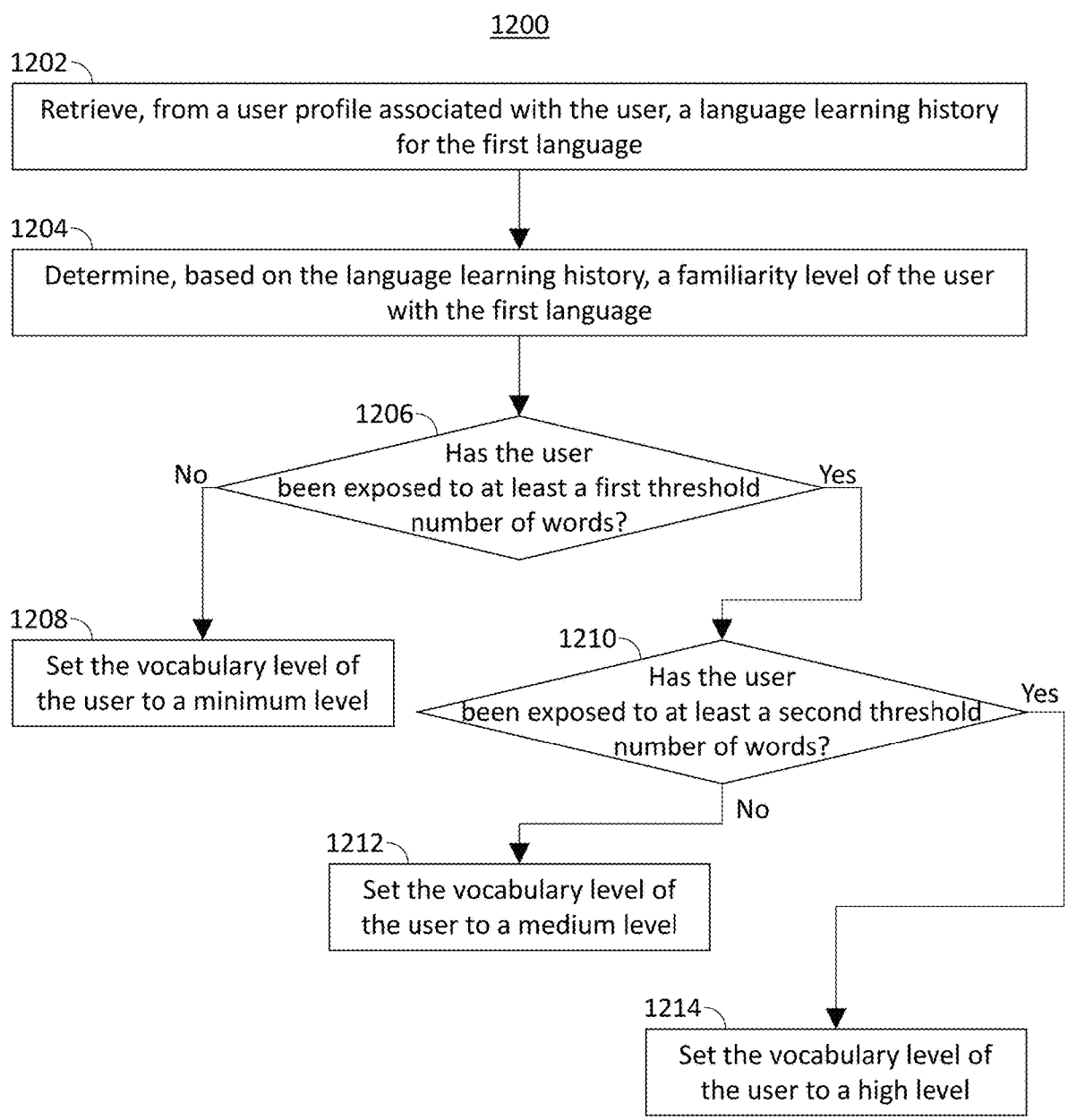
FIG. 12 is a flowchart representing an illustrative process for identifying a user vocabulary level, in accordance with some embodiments of the disclosure.

FIG. 12 is a flowchart representing an illustrative process 1200 for identifying a user vocabulary level, in accordance with some embodiments of the disclosure. Process 1200 may be implemented on control circuitry 910. In addition, one or more actions of process 1200 may be incorporated into or combined with one or more actions of any other process or embodiment described herein.

At 1202, control circuitry 910 retrieves, from a user profile associated with the user, a language learning history for the first language. The language learning history may include words previously learned by the user through a language learning service or application. The language learning history may also include previously predicted new words generated for display to the user during consumption of other media assets. Other types of exposure of the user to the first language may also be tracked, such as consumption of books, articles, etc. in the first language.

At 1204, control circuitry 910 determines, based on the language learning history, a familiarity level of the user with the first language. For example, control circuitry 910 may count the number of words learned by, or familiar to, the user and calculate a vocabulary level as a function of the number of words learned and the number of words used by the average native speaker of the first language. For example, the average native speaker of the first language may use 10,000 words. The user may be familiar with 500 words. The user's vocabulary level may therefore be calculated as five percent.

At 1206, control circuitry 910 determines whether the user has been exposed to at least a first threshold number of words. For example, the number of words to which the user has been exposed is compared to a minimum threshold of words. If the number of words to which the user has been exposed does not meet the minimum threshold ("No" at 1206), then, at 1208, control circuitry 910 sets the vocabulary level of the user to a minimum level.

If the number of words to which the user has been exposed meets or exceeds the minimum threshold ("Yes" at 1206), then, at 1210, control circuitry 910 determines whether the user has been exposed to a second threshold number of words. For example, the number of words to which the user has been exposed is compared to a maximum threshold of words. If the number of words to which the user has been exposed does not meet the second threshold ("No" at 1210), then, at 1212, control circuitry 910 sets the vocabulary level of the user to a medium level. If the number of words to which the user has been exposed meets or exceeds the second threshold ("Yes" ay 1210), then, at 1214, control circuitry 910 sets the vocabulary level of the user to a high level.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
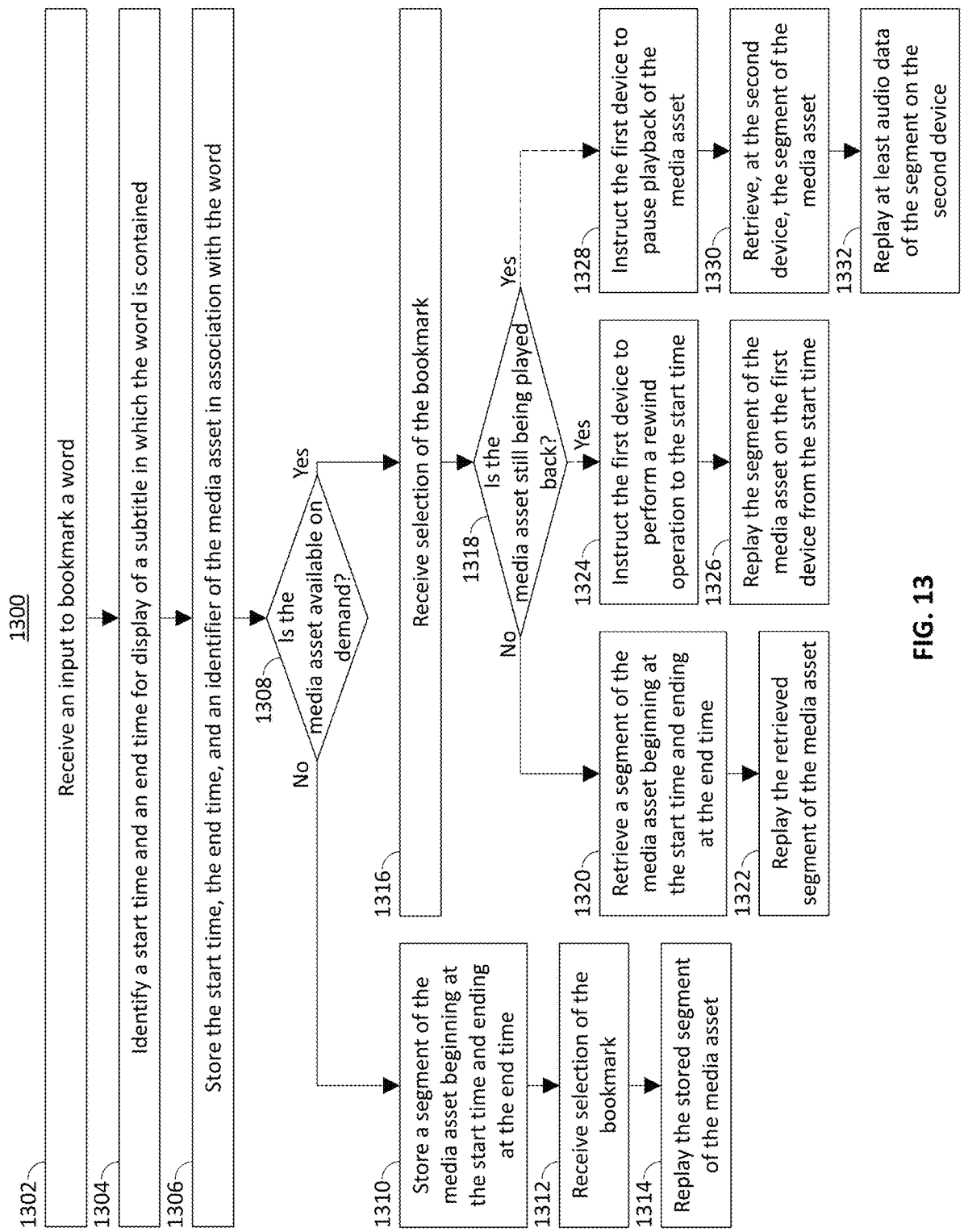
FIG. 13 is a flowchart representing an illustrative process for replaying a segment of a media asset corresponding to a bookmarked word, in accordance with some embodiments of the disclosure.

FIG. 13 is a flowchart representing an illustrative process 1300 for replaying a segment of a media asset corresponding to a bookmarked word, in accordance with some embodiments of the disclosure. Process 1300 may be implemented on control circuitry 910. In addition, one or more actions of process 1300 may be incorporated into or combined with one or more actions of any other process or embodiment described herein.

At 1302, control circuitry 910 receives an input to bookmark a word. For example, the user may select, via the second device, to bookmark a word currently displayed on the second device. Control circuitry 910 may receive a notification, either directly from the second device or through a server, of the selection to bookmark the word.

At 1304, control circuitry 910 identifies a start time and an end time for display of a subtitle in which the word is contained. As described above, subtitle metadata may include a start time and an end time for display of each subtitle, and these times may be temporarily stored in association with each predicted new word. Upon selection to bookmark the word, the stored start time and end time are retrieved from temporary storage. At 1306, control circuitry 910 stores, as a bookmark, the start time, the end time, and an identifier of the media asset in association with the word.

At 1308, control circuitry 910 determines whether the media asset is available on demand. For example, control circuitry 910 may evaluate the media source from which the media asset is being received. If the media asset is being received from an OTT streaming service (e.g., Netflix), then the media asset may be determined to be available on demand. If, however, the content is being received from a cable TV set-top box that is not tuned to a VOD program, it may be determined that the media asset is not available on demand.

If the media asset is not available on demand ("No" at 1308), then, at 1310, control circuitry 910 stores a segment of the media asset beginning at the start time and ending at the end time. For example, the segment may be recorded to a local storage device or a cloud storage system. At 1312, control circuitry 910 receives selection of the bookmark and, in response, at 1314, replays the stored segment of the media asset. The segment may be replayed on the first device or the second device.

If the media asset is available on demand ("Yes" at 1308), then no storage of the segment need be performed, and processing continues to 1316, where control circuitry 910 receives a selection of the bookmark. In response to the selection, at 1318, control circuitry 910 determines whether the media asset is still being played back on the first device. For example, control circuitry 910 may determine whether an identifier of the currently playing media asset matches the stored identifier of the media asset in the bookmark. If the media asset is not still being played back ("No" at 1318), then, at 1320, control circuitry 910 retrieves a segment of the media asset beginning at the start time and ending at the end time. For example, control circuitry 910 may establish a streaming session with the media source from which the media asset is available and request portions or segment (e.g., MP4 fragments) beginning at the start time and ending at the end time. At 1322, control circuitry 910 then replays the retrieved segment of the media asset. As above, the replay may occur on either the first device or the second device.

If the media asset is still being played back ("Yes" at 1318), then one or two actions may be performed by control circuitry 910. At 1324, control circuitry 910 may instruct the first device to perform a rewind operation to the start time and, at 1326, replays the segment of the media asset of the first device from the start time. In some cases, this may only be performed if no other users are present and watching the media asset with the user. Alternatively, at 1328, control circuitry 910 may instruct the first device to pause playback of the media asset. At 1330, control circuitry 910 retrieves, at the second device, the segment of the media asset and, at 1332, replays at least audio data of the segment on the second device. Again, in some cases, this may only be performed if no other users are present and watching the media asset with the user.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

If the user is first learning a language, their vocabulary level will be set as low as possible. This may result in too many words being displayed on the second screen device, as essentially every word will be predicted as new. This may overwhelm the user and prevent them from effectively learning the language. In such cases, a compromise is needed between presenting every predicted new word and presenting too many words too quickly. Accordingly, in some embodiments, control circuitry 910 determines whether the user is actively looking at the second screen device. If so, the auto-scrolling of the list of words, the generating of new words for display, or both, may be delayed, slowed, or stopped altogether to allow the user sufficient time to review and understand words that are already being displayed on the second screen device. Control circuitry 910 may automatically pause playback of the media asset while the user reviews the words. Alternatively, a UI element may be generated for display on the second screen device for re-syncing the display of predicted new words with the current playback position of the media asset. This allows the user to skip review of predicted new words that were included in the subtitles corresponding to the portion of the media asset that was played back during the time the user was reviewing the words already generated for display. If this option is selected, the skipped words are excluded from the next determination by control circuitry 910 of the user's vocabulary level, which may be based on words to which the user has been exposed.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for fast, intuitive, personalized language learning from subtitles, the method comprising:
   identifying a vocabulary level of a user in a first language;
   during playback, on a first device, of a media asset, extracting subtitles in the first language for at least a portion of the media asset, the subtitles comprising a plurality of words in the first language;
   predicting, based on the vocabulary level, a subset of words of the plurality words that are new to the user;
   generating for display, on a second device associated with the user, the subset of words and a respective explanation of each word of the subset of words;
   receiving an input to bookmark a word of the subset of words;
   based on receiving the input:
      identifying a start time and an end time for display of a subtitle in which the word is contained; and
      storing the start time, the end time, and an identifier of the media asset in association with the word;
   storing a segment of the media asset beginning at the start time and ending at the end time; and
   based on receiving a selection of the bookmark, replaying the stored segment.

2. The method of claim 1, wherein identifying a vocabulary level of the user in the first language further comprises:
   retrieving, from a user profile associated with the user, a language learning history for the first language; and
   determining, based on the language learning history, a familiarity level of the user with the first language.

3. The method of claim 1, wherein generating for display, on the second device associated with the user, the subset of words and a respective explanation of each word of the subset of words further comprises:
   transmitting, to the second device, the subset of words and the respective explanations.

4. The method of claim 1, wherein generating for display, on the second device associated with the user, the subset of words and a respective explanation of each word of the subset of words further comprises:
   adding the subset of words and the respective explanation of each word to a list of words and corresponding explanations that have previously been generated for display during playback of the media asset; and
   automatically scrolling the list such that the subset of words is visible on a display of the second device.

5. The method of claim 1, further comprising:
   in response to receiving a selection of the bookmark:
      retrieving the identifier of the media asset; and
      based on the identifier of the media asset, the start time, and the end time, replaying a segment of the media asset beginning at the start time and ending at the end time.

6. The method of claim 5, wherein replaying the segment of the media asset corresponding to the display time comprises instructing the first device to perform a rewind operation to the start time.

7. The method of claim 5, wherein replaying the segment of the media asset corresponding to the display time comprises:
   instructing the first device to pause playback of the media asset;
   retrieving, at the second device, the segment of the media asset; and replaying at least audio data of the segment on the second device.

8. The method of claim 1, wherein generating for display, on a second device associated with the user, the subset of words and a respective explanation of each word of the subset of words further comprises:
retrieving a sentence from the subtitles, the sentence including a word of the subset of words; and
transmitting, to the second device, the sentence and the respective explanation of the word of the subset of words.

9. A system for fast, intuitive, personalized language learning from subtitles, the system comprising:
input/output circuitry; and
control circuitry configured to:
identify a vocabulary level of a user in a first language;
during playback, on a first device, of a media asset, extract subtitles in the first language for at least a portion of the media asset, the subtitles comprising a plurality of words in the first language;
predict, based on the vocabulary level, a subset of words of the plurality words that are new to the user;
generate for display, via the input/output circuitry, on a second device associated with the user, the subset of words and a respective explanation of each word of the subset of words
receive an input to bookmark a word of the subset of words;
based on receiving the input:
identify a start time and an end time for display of a subtitle in which the word is contained; and
store the start time, the end time, and an identifier of the media asset in association with the word;
store a segment of the media asset beginning at the start time and ending at the end time; and
based on receiving a selection of the bookmark, replay the stored segment.

10. The system of claim 9, wherein the control circuitry configured to identify a vocabulary level of the user in the first language is further configured to:
retrieve, using the input/output circuitry, from a user profile associated with the user, a language learning history for the first language; and
determine, based on the language learning history, a familiarity level of the user with the first language.

11. The system of claim 9, wherein the control circuitry configured to generate for display, via the input/output circuitry, on the second device associated with the user, the subset of words and a respective explanation of each word of the subset of words is further configured to:
transmit, to the second device, the subset of words and the respective explanations.

12. The system of claim 9, wherein the control circuitry configured to generate for display, via the input/output circuitry, on the second device associated with the user, the subset of words and a respective explanation of each word of the subset of words is further configured to:
add the subset of words and the respective explanation of each word to a list of words and corresponding explanations that have previously been generated for display during playback of the media asset; and
automatically scroll the list such that the subset of words is visible on a display of the second device.

13. The system of claim 9, wherein the control circuitry is further configured to
in response to receiving a selection of the bookmark:
retrieve the identifier of the media asset; and
based on the identifier of the media asset, the start time, and the end time, replay a segment of the media asset beginning at the start time and ending at the end time.

14. The system of claim 13, wherein the control circuitry configured to replay the segment of the media asset corresponding to the display time is further configured to instruct the first device to perform a rewind operation to the start time.

15. The system of claim 13, wherein the control circuitry configured to replay the segment of the media asset corresponding to the display time is further configured to:
instruct the first device to pause playback of the media asset;
retrieve, at the second device, the segment of the media asset; and
replay at least audio data of the segment on the second device.

16. The system of claim 9, wherein the control circuitry configured to generate for display, using the input/output circuitry, on a second device associated with the user, the subset of words and a respective explanation of each word of the subset of words is further configured to:
retrieve a sentence from the subtitles, the sentence including a word of the subset of words; and
transmit, to the second device, using the input/output circuitry, the sentence and the respective explanation of the word of the subset of words.

* * * * *